US006615023B1

(12) United States Patent
Ehrensvärd

(10) Patent No.: US 6,615,023 B1
(45) Date of Patent: Sep. 2, 2003

(54) SYSTEM FOR WIRELESS, BI-DIRECTIONAL TRANSFER OF ELECTRIC SIGNALS

(75) Inventor: Jakob Ehrensvärd, Täby (SE)

(73) Assignee: Cypak AB, Täby (SE)

( * ) Notice: Subject to any disclaimer, the term of this patent is extended or adjusted under 35 U.S.C. 154(b) by 0 days.

(21) Appl. No.: 09/507,089

(22) Filed: Feb. 18, 2000

(51) Int. Cl.[7] .......... H04B 5/00

(52) U.S. Cl. .......... 455/41; 455/39; 235/451; 340/870.37; 340/870.3

(58) Field of Search .......... 455/41, 39, 343, 455/73, 127, 558, 80, 334; 340/10.1, 10.2, 10.5, 854.8, 854.6, 853.1, 855.1, 870.37, 870.3; 235/451, 492, 439

(56) References Cited

U.S. PATENT DOCUMENTS 4,480,178 A * 10/1984 Miller et al. .......... 235/380
4,654,880 A * 3/1987 Sontag .......... 455/41
4,795,898 A * 1/1989 Bernstein et al. .......... 235/487
4,876,535 A * 10/1989 Ballmer et al. .......... 340/5.8
5,428,659 A * 6/1995 Renner et al. .......... 378/162
5,847,447 A * 12/1998 Rozin et al. .......... 257/678
6,173,899 B1 * 1/2001 Rozin .......... 235/492
6,336,031 B1 * 1/2002 Schyndel .......... 455/41

* cited by examiner

*Primary Examiner*—Edward F. Urban
*Assistant Examiner*—Sonny Trinh
(74) *Attorney, Agent, or Firm*—Renner, Otto, Boisselle & Sklar, LLP

(57) ABSTRACT

A low-cost system for wireless, bi-directional transformation of electric signals over a capacitive interface between a host unit and a guest unit is provided. The system allows a high impedance in the circuitry of the guest unit to obtain a good signal transfer ability in conditions of poor dieelectric materials, poor conductivity in the contact pads and relatively large gaps between the contact pads. The capacitive interface comprises a respective first (A1; B1), second (A2; B2) and third (A3; B3) conductive area in the host and guest units (10,40). The first conductive area (A1) of the host unit is connected to a self-tuning frequency generating resonant circuit (16) in the host unit (10) for obtaining high gain of signals transmitted to the guest unit (40). The second and third conductive areas (A2, A3) of the host unit are connected to an impedance circuit (30) in the host unit for receiving signals from the guest unit. The first and second conductive areas (B1, B2) of the guest unit are further connected to an impedance circuit (44) in the guest unit for receiving signals from the host unit. In a preferred embodiment, the first and third conductive areas (B1, B3) of the guest unit are also galvanically interconnected.

10 Claims, 3 Drawing Sheets

SYSTEM FOR WIRELESS, BI-DIRECTIONAL TRANSFER OF ELECTRIC SIGNALS

FIELD OF THE INVENTION

The present invention relates to a system for wireless, bi-directional transfer of electric signals between a host unit such as a data reader and a mobile guest unit such as an information carrier, particularly a packaging such as a cardboard box. While the electric signals primarily are used to represent digital data information, the system can also be used to transfer electric energy from the stationary unit to the mobile guest unit.

Prior art systems of this type are known from U.S. Pat. Nos. 4,876,535 and 5,847,447.

BACKGROUND OF THE INVENTION

Today's advances in mobile computing have created a vast amount of small and portable devices, generally operated on battery power. In applications ranging from cellular phones, handheld computers to data collection devices, such as electronic metering instruments, data loggers etc. sufficient data processing capabilities are now incorporated to perform direct data exchange between the portable unit and a host computer. Information is often transferred both ways, where parameter setup, transferring of memos and other field data is information provided from the host computer and results, such as measured values, are transferred back to the host device.

There are also passive portable devices, such as identity cards (Smart- or IC-cards) or packaging identifier, where the device is generally powered down when being out in the field and no battery power is provided. When attached to the host computer, the device is powered and can perform data exchange. Information is generally kept in non-volatile memory.

The straightforward way of performing data exchange is by direct cable connection, where several standardized interfaces and protocols exists. The CCITT V.24/V.28/EIA RS-232 is by far the most common electrical specification where several standardized and proprietary protocol mechanisms exist in controlling the data transfer process.

There is a general understanding that cable connections suffer several drawbacks, where the most obvious can be summarized as;

- A slow manual process of aligning, attaching and detaching cable connectors.
- Mechanical degradation of contacts and contact elements.
- Environmental degradation due to humidity, water, dirt and corrosion.
- Open slots, which expose vital parts of the device for dirt and electromagnetic interference, such as electrostatic discharge.

In many applications it is desirable to perform data transfer in a wireless manner. Several commonly used methods are available, such as Radio Frequency (RF) and Infrared radiation. RF devices have the obvious benefit of being able to transmit information over long distances, but generally suffer from high power requirements and careful selection of antenna and oscillator design to maintain selectivity and not interfering with other devices in the public bands. Infrared beams have the benefit of being simple to implement, but requires careful alignment and clear sight between the transmitting and receiving ends.

Where a close-proximity relationship exists between two devices, there are several proprietary methods developed for transmitting information, relying on the near-field effects of electromagnetic wave propagation. Generally, this is divided into inductive (magnetic field) propagation and capacitive (electric field) propagation. Some methods include a combination of both.

Magnetic field propagation relies on energizing a first coil with alternating current, where, magnetic energy is radiated. By placing a second coil in proximity to the first coil, an inducted current generates an alternating voltage over the second coil.

Capacitive field propagation relies on applying an alternating voltage on a first electrical conductive surface. By approaching a second electrical conductive surface to the first, the electrostatic charge between the surfaces in the form of an alternating voltage can be measured between the second surface and a common ground. To obtain a current flow to a portable device, a corresponding second set of conductive surfaces needs to be formed to close the loop.

As the impedance of an inductance increases with frequency, good magnetic coupling is achieved at lower frequencies. The drawback with inductive transfer in portable systems is the high-energy losses, which primary relates to resistive and flux losses in a coil. Also, the manufacturing of coils is relatively expensive.

In contrast, the capacitor impedance decreases with increasing frequency. The loss in a practical capacitor is low in comparison to a coil, due to low values of serial and parallel resistances. The drawback with capacitive transfer is the need for high voltages and large surface areas in order to achieve good coupling, as the capacitance decreases as the distance between the capacitive surfaces increase.

Prevailing systems for capacitive data transfer rely on good capacitive coupling between the devices. In applications where the electrically conductive material used to form the capacitive element is poor in terms of resistive conductivity or the distance and/or dielectric properties of the medium between the capacitive elements, where air is considered equal to additional distance, these methods are not sufficient for proper operation.

In some applications addressed by the present invention the following characteristics are desired:

- Micropower quiescent current requirements. The portable device should preferably have virtually zero quiescent current.
- The host device interface should be low power in order to be able to be powered from the small amount available from a V.24/V.28 serial port.
- Must work properly on distances up to a few millimeters.
- Must work properly even if the coupling surface is not perfectly flat.
- Must work properly independent of the dielectric medium present between the devices.
- Must work properly where the capacitor plates are made of poor electrically conductive material, such as conductive polymers, graphite, or Indium-Tin Oxide (ITO).
- Should be relatively insensitive for misalignments of transceivers.
- Should preferably be insensitive for rotational displacements in steps of 180° .
- Be simple and inexpensive to implement and not require any manual tuning or rely on narrow tolerance component values.

OBJECTS OF THE INVENTION

An object of the invention is to provide a low-cost system for wireless, bi-directional transfer of electric signals over a capacitive interface which allows for a high impedance in the circuitry of the guest unit in order to obtain a good signal transfer ability in conditions of poor dieelectric materials, poor conductivity in the contact pads and relatively large gaps between the contact pads.

Another object is to provide a system which allows for the mobile unit to be rotated 180 degrees so that cooperating pairs of the contact pads may be unintentionally shifted without loss of functionality. This is of importance when transferring information between box-shaped packages and a stationary unit.

SUMMARY OF THE INVENTION

According to an aspect of the invention there is provided a system for wireless, bidirectional transfer of electric signals over a capacitive interface formed between electric circuitry contained partly in a host unit and partly in a guest unit when the units are placed in a proximity relationship. The capacitive interface comprises a respective first, second and third conductive area in the host and guest units. The first conductive area of the host unit is connected to a frequency generating resonant circuit in the host unit for coupling high amplitude signals transmitted to the guest unit. The second and third conductive areas of the host unit are connected to an impedance circuit in the host unit for receiving signals from the guest unit. The first and second conductive areas of the guest unit being connected to an impedance circuit in the guest unit for receiving signals from the host unit. Also, the first and third conductive areas of the guest unit are interconnected.

The frequency generating resonant circuit provides a carrier output to the first conducting area of the host unit. By the resistive feedback this design provides for an automatic tuning of the resonant circuit to operate at its peak output amplitude, relatively independent of the complex impedance loading of the conductive area. By this arrangement there is obtained a relatively high amplitude output from the host unit. The circuitry and conducting areas, particularly in the host unit can therefore be fabricated from non-expensive relatively low-conductive materials, such as conducting polymer materials, which can be applied by printing to the substrates for the circuitry and the conducting areas.

By interconnecting the first and third conductive areas of the guest unit, a side of the capacitive interface is allowed to be rotated in half-turns without loss of signal transfer function when the conductive areas are arranged consecutively in a line.

DESCRIPTION OF THE PREFERRED EMBODIMENT

The system is comprised of two units, each having a transceiver interface. In the following description the units are referred to as the "host" and the "guest" units, respectively. The term "host" relates to the device that supplies the carrier frequency output. The term "guest" is used herein for ease of description; the guest unit according to the invention is a mobile or portable unit. Since the host unit has a higher operating current, it is desirable that the device with the strictest requirements for low power usage is the portable unit.

There is no implication on a protocol level that there is a master-slave relationship between the host and guest unit.

The invention itself does not put any implication of the transceiver being an integral part of the host or the guest interface.

Figure 1:
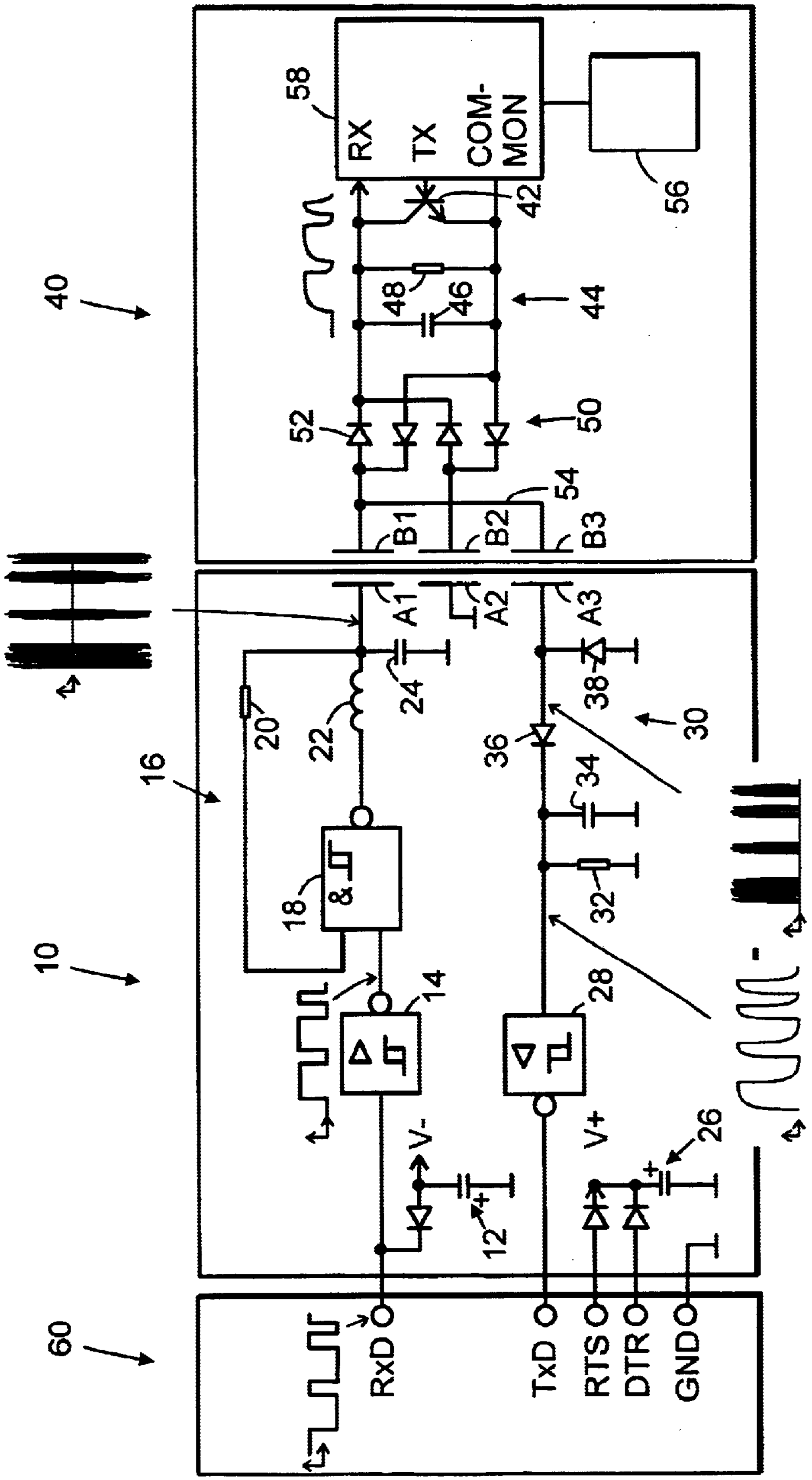
FIG. 1 is a block and circuit diagram of a system including a host unit and a guest unit according to the invention.
Figure 2:
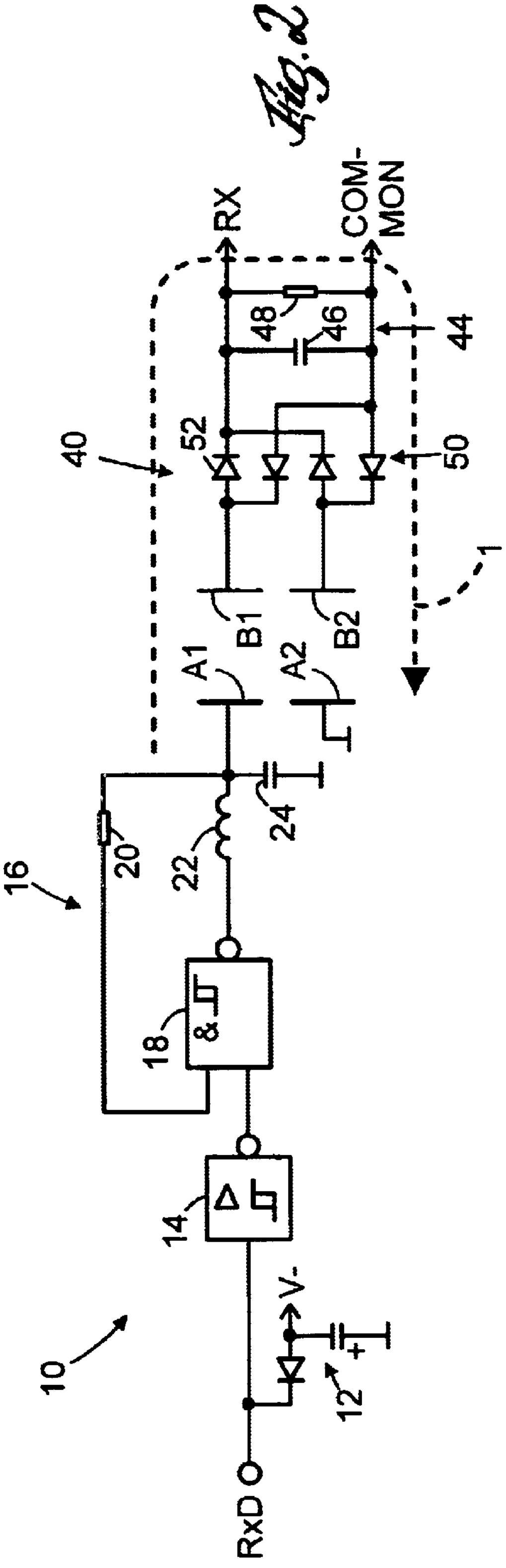
FIG. 2 shows a first closed capacitive loop in the system of FIG. 1.

In the diagrammatic representation shown on FIG. 1, a host computer 60 is equipped with an external host unit 10 sharing a capactive interface in close proximity to a guest unit 40 including a microprocessor 56 connected via an interface 58. Three pairs of conductive areas, i.e. first conductive areas A1-B1, second conductive areas A2-B2, and third conductive areas A3-B3, form the common capacitive interface. As indicated in FIG. 2, each conductive area which includes a capacitive plate can be shaped as a rectangular plate or even a printed patch, printed onto an inner planar surface of a cover housing the respective units 10, 40.

The guest unit 40 can be a mobile or portable low cost data collection device of various kinds ranging from credit-card sized transaction devices to identifier devices mounted onto to or integrated in the cardboard material of packages.

The host computer 60 is considered to be a standard personal computer, which is generally equipped with a V.24/V.28 interface as standard. However, several devices, including laptop computers, Personal Digital Assistants (PDAs) and Programmable Logic Controllers (PLCs) also have V.24/V.28 interfaces.

The host computer 60 is equipped with a proprietary software driver (not shown) to control the data flow for the host interface 10. Depending on the desired functionality, this driver can either be an installed driver module or a part of an application program.

The CCITT V.24/V.28 electrical specification states a minimum voltage output swing at a stated loading. Even though the specification itself does not state that an attached device may be powered from the interface, as long as the stated maximum loading is not exceeded, it is a benefit to be independent of external power, In an application where it is undesired to put further loading on the serial port or the serial port itself does not fully comply to the driver requirements stated in the specification, external power may be applied from an AC/DC adapter or batteries included in the host unit 10. If desired, an interface control signal may be used to control the power of the host unit 10, where one state is a low-power, standby condition and the other an active, full-power state.

A principal circuit schematic of the host unit 10 may be implemented as follows:

The host unit 10 is designed to be connected to a standard V.24/V.28 serial port, where the voltage levels of outputs RTS and DTR are programmed by system software to be at a high level, thereby providing a positive supply voltage for the, circuit elements. The Receive Data Input (R×D) has mark level at a negative level, thereby providing a negative supply for a level shifter 28. Additional tank and smoothing capacitors 12, 26 are provided and may be supplemented with a voltage-stabilizing element, such as a parallel zener diode (not shown).

A level shifter 14 provides shifting of input voltages to the host unit, and has a logic high output when the input is at mark level, i.e. inactive. An oscillator schmitt-trigger NAND circuit 16 will then oscillate at a frequency primarily set by a LC resonant circuit comprising a resistor 20, an inductance 22, and a capacitor 24 present on the output of schmitt-trigger 18. This resonant circuit provides a carrier output to conducting area A1. By the resistive feedback this design provides for an automatic tuning of the resonant circuit to operate at its peak output amplitude, relatively independent of the complex impedance loading of A1. By selecting a CMOS/HCMOS schmitt-trigger 18, the value of resistive feedback can be kept high to reduce the loading of the resonant circuit. Further benefits of using HCMOS devices includes low operating power, low output impedance, rail-to-rail output swing and input protection diodes, thereby providing a high output swing of the resonant circuit with a minimum of design complexity.

When a space level is present on the input of level shifter 14, a logic low output disables the oscillator function, so that the output of the resonant circuit fades and a DC level is present on terminal A1. When a serial data stream is received on the input of level shifter 14, the output of the resonant circuit will provide a pulse-modulated carrier, which is then capacitively coupled over to the portable device.

The guest unit 40 has a high input impedance and is further explained below in the description of the guest unit 40.

Figure 3:
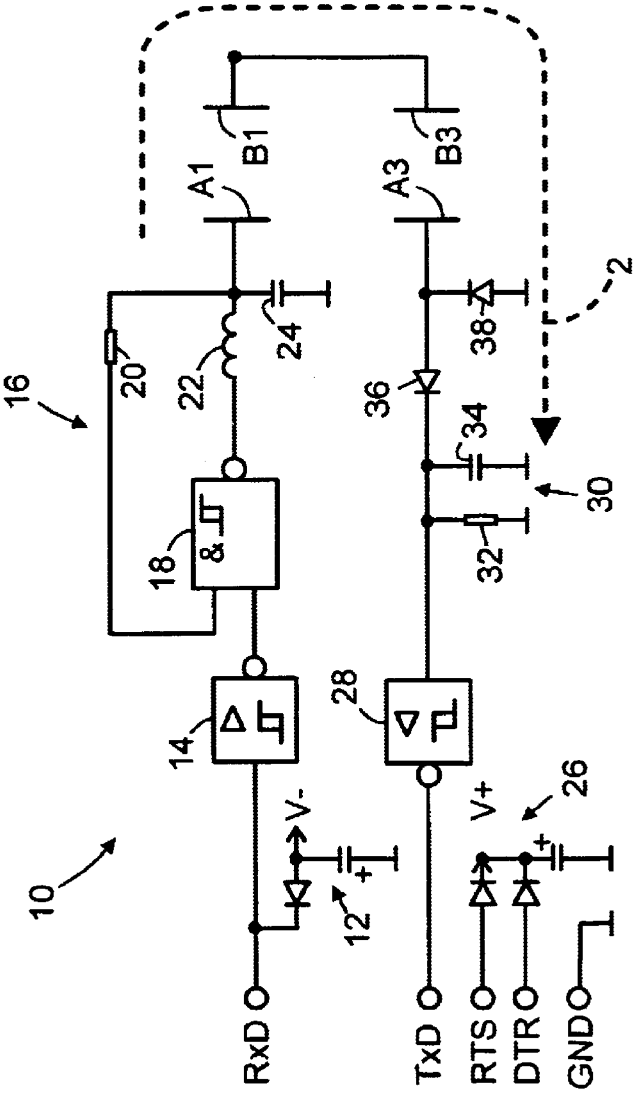
FIG. 3 shows a second closed capacitive loop in the system of FIG. 1.
Figure 4:
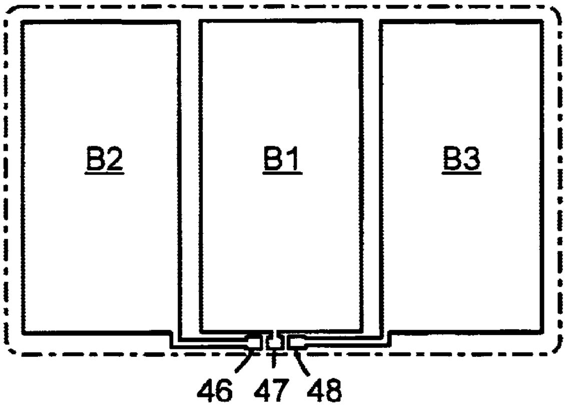
FIG. 4 shows an arrangement of conductive areas of a capacitive interface in a guest unit according to the invention.
Figure 5:
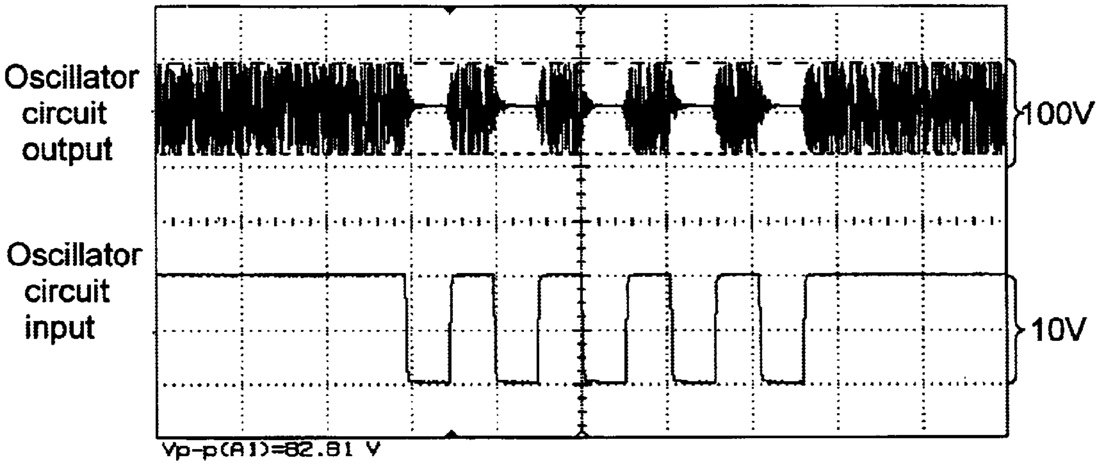
FIG. 5 is an oscilloscope readout showing a signal input to the host unit and a signal output from the host unit according to the invention.

The oscilloscope readout in FIG. 3 shows a an output from the resonant circuit vs. an input of level shifter 14 when a binary 0×55 pattern is sent from the host computer 60.

In the oscilloscope readout, a supply voltage of 5V provides an output peak-to-peak amplitude of 80 V. By further increasing the supply voltage, the output amplitude will increase accordingly.

When capacitive interface plates B2 and B1/B3 are placed in close proximity to the corresponding plates A2, A1 and A3, capacitors are formed by plates A1-B1, A2-B2 and A3-B3. The actual capacitor values are primarily given by the place size, the distance between the plates and the type of dielectric material(s) present between them.

As apparent from FIG. 1, the capacitor plates plates B1 and B3 are electrically interconnected by a conductor 54. Thereby a reduced stray capacitive coupling is obtained between plates A1 and A3. In addition, thereby the capacitive interface will also be symmetric, i.e. the guest unit can be rotated in steps of 180° in the plane of the capacitive interface without loss of functionality.

A first closed capacitive loop 1 (FIG. 2) is formed by following the output of the resonant circuit in the host unit 10, via plates A1-B1 to the guest unit 40, through a rectifier bridge 50 having four diodes 52, through the parallel impedance circuit 44 including a capacitor 46 and a resistor 48, and back to ground in the host unit 10 via places B2-A2.

A second closed capacitive loop 2 (FIG. 3) is formed by following the output of the resonant circuit in the host unit 10, via plates A1-B1, B3-A3 and via the input diode 36 and resistor 32 down to ground via a rectifier diode 38 in the host unit 10.

When the oscillator circuit 16 in the host unit 10 is enabled, the first capacitive loop 1 induces a voltage on terminal RX in the guest unit 40. By an optional peak-hold diode and a tank capacitor (not shown), a low-current circuitry can then be powered in the guest unit 40, without severely affecting the signal transfer between the host unit 10 and the guest unit 40.

When the oscillator 18 is modulated by a data stream from the host computer 60, a corresponding demodulated output is formed at terminal RX in the guest unit 40. By providing an optional voltage limiter and schmitt-trigger (not shown) on RX, a clean, demodulated signal can be directly processed by the microprocessor 56 in the guest unit 40.

The guest unit further comprises a transistor 42 connected in parallell with the impedance circuit 44. Digital data information can be transmitted back from the guest unit 40 to the host unit 10 by controlling the transistor 42 from a TX terminal in the guest unit 40. When the transistor 42 conducts, the input on plate B1 is effectively shorted to ground via plates B2-A2, thereby attenuating the voltage on plate B3 coupled to plate A2. The quiescent coupling of the carrier filtered in the input network connected to the level shifter 28 in the host unit 10 is then attenuated. A properly selected threshold value of the input to level shifter 28 together with a hysteresis perform the demodulation of the information transferred from the guest unit 40 to the host computer 60.

In the case of power transfer from the host unit 10 to the guest unit 40, it is an undesired effect that NRZ (Non-Return to Zero)-modulated data disable the voltage on the RX terminal in the guest unit. By applying a different modulation scheme well known in the art, such as PPI, FM or Manchester, the off-time can be reduced, thereby enabling a more continuous voltage in the guest unit 40.

In summary, the preferred embodiment describes an inexpensive, easy to implement, self-tuned design with relaxed requirements of the reactive components. Components having a relatively poor tolerance of about ±10% of ideal values are usable in the inventive system and are widely available at a low cost. The capacitive loading formed by the guest unit 40 as well as different stray capacitances just slightly moves the oscillator center frequency, without severely affecting the output amplitude.

As the host unit 10 operates at low power, it can be directly powered from the interface signals, thereby eliminating the need for external power, such as provided from an AC adapter or a set of batteries.

The portable device operates at virtually zero quiescent current, without compromising the abilities to receive data at any time.

What is claimed is:

1. A system for wireless, bi-directional transfer of electric signals over a capacitive interface formed between electric circuitry contained partly in a host unit and partly in a guest unit when the units are placed in a proximity relationship;

said capacitive interface comprising a respective first (A1; B1), second (A2; B2) and third (A3; B3) conductive area in the host and guest units (10,40);

said first conductive area (A1) of the host unit being connected to a frequency generating resonant circuit (16) in the host unit (10) for transmitting signals to the guest unit (40);

said second and third conductive areas (A2, A3) of the host unit being connected to an impedance circuit (30) in the host unit for receiving signals from the guest unit;

said first and second conductive areas (B1, B2) of the guest unit being connected to an impedance circuit (44) in the guest unit for receiving signals from the host unit; and said first and third conductive areas (B1, B3) of the guest unit being interconnected.

2. The system of claim 1, wherein said frequency generating resonant circuit is adapted to be self-tuned to operate at its maximum output substantially independent of a complex loading impedance.

3. The system of claim 1, wherein said frequency generating resonant circuit comprises a schmitt-trigger and a resonant circuit comprising a feed-back resistor, an inductance, and a capacitor on the output of the schmitt-trigger.

4. The system of claim 1, wherein said conductive areas are arranged consecutively in line in the respective host and guest units for allowing halt-turn rotation of a side of said capacitive interface without loss of signal transfer function.

5. The system of claim 1, further comprising a transistor connected in parallel to said impedance circuit in the guest unit for transmitting signals to the host unit.

6. A system for wireless, bi-directional transfer of electric signals over a capacitive interface formed between electric circuitry contained partly in a host unit and partly in a guest unit when the units are placed in a proximity relationship;

said capacitive interface comprising a respective first, second and third conductive area in the host and guest units;

said first conductive area of the host unit being connected to a frequency generating circuit and a resonant circuit comprising a resistor, an inductance, and a capacitor on the output of the frequency generating circuit, for transmitting signals to the guest unit;

said second and third conductive areas of the host unit being connected to an impedance circuit in the host unit for receiving signals from the guest unit; and said first and second conductive areas of the guest unit being connected to an impedance circuit in the guest unit for receiving signals from the host unit.

7. The system of claim 6, wherein said frequency generating resonant circuit is adapted to be self-tuned to operate at its maximum output substantially independent of a complex loading impedance.

8. The system of claim 6, wherein said first and third conductive areas of the guest unit are interconnected.

9. The system of claim 8, wherein said conductive areas are arranged consecutively in line in the respective host and guest units for allowing half-turn rotation of a side of said capacitive interface without loss of signal transfer function.

10. The system of claim 6, further comprising a transistor connected in parallel to said impedance circuit in the guest unit for transmitting signals to the host unit.

* * * * *